United States Patent

Hansen et al.

[15] 3,675,132
[45] July 4, 1972

[54] SEARCH-LOCK SYSTEM

[72] Inventors: Neil W. Hansen, Pompton Plains, N.J.; Nathan Orenstein, New York, N.Y.

[73] Assignee: The United States of America as represented by the Secretary of the Navy

[22] Filed: Aug. 31, 1970

[21] Appl. No.: 68,581

[52] U.S. Cl. ..................... 325/423, 325/346, 178/7.3 R, 328/73, 329/122, 329/145, 331/4, 331/10, 331/14, 331/17, 331/32, 331/172
[51] Int. Cl. ..................................................H04b 1/26
[58] Field of Search ........................... 325/346, 416–423; 328/72–75; 343/228; 178/5.8 AF, 7.3 R; 329/122, 145, 153, 154, 178; 331/4, 10, 14, 17, 20, 22, 32, 173, 175, 178, 179, 172

[56] References Cited

UNITED STATES PATENTS 2,789,226   4/1957   Nibbe ............................ 331/4
3,569,838   3/1971   Blair ............................ 325/423

*Primary Examiner*—Albert J. Mayer
*Attorney*—Richard S. Sciascia and Henry Hansen

[57] ABSTRACT

A received RF signal is mixed with the output of a voltage-controlled local oscillator to provide an IF signal which is simultaneously passed to a frequency discriminator and a circulating memory. Control voltage for the oscillator is provided by an AFC unit which comprises an integrator receiving selected constant voltage inputs. During the search mode a search ramp is generated by the integrator. A flyback circuit causes the search voltage to repeat its traverse over a prescribed range. Bipolar video discriminator outputs above a predetermined threshold place the system in the lock mode and selectively gate two settable, constant voltage inputs to furnish a triangle wave integrator output centered on a voltage corresponding to the desired local oscillator frequency. The oscillator output is mixed with the stored IF to produce a replica of the input signal.

8 Claims, 6 Drawing Figures

INVENTORS
NEIL W. HANSEN
NATHAN ORENSTEIN

SEARCH-LOCK SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates in general to radar receivers and more particularly to search-lock systems for radar receivers employing automatic frequency control of a local oscillator.

The conventional radar receiver is essentially a special type of superheterodyne receiver. Its function is to receive weak echoes returned to the antenna system by a target, combine them in a crystal mixer with the RF signals from a local oscillator, amplify the resultant IF or difference signal, detect the pulse envelope, amplify the resulting DC pulses and feed them to the radar indicator. In order to keep radar receivers in tune with their companion transmitters, some means of automatic frequency control of the local oscillator frequency is commonly used, especially in high frequency, microwave radar. A small fraction of the RF energy from the transmitter line is mixed with a portion of the RF energy from the local oscillator. The resultant IF frequency representing the difference between transmitter RF and local oscillator RF is amplified, rectified and applied via control circuits to tune the local oscillator frequency. If the IF is of the correct frequency, the local oscillator frequency is held constant. If the IF is too low or too high, voltage is applied to the local oscillator causing the frequency to shift accordingly. A frequency discriminator circuit producing a bipolar video output is commonly employed to test the frequency of the IF signal.

In adjusting the local oscillator frequency, two distinct types of automatic frequency control have been used in prior radar receivers. Proportional AFC generally applies corrective voltages which are proportional to the magnitude of the error indicated by the discriminator video output. These voltages are applied directly to the local oscillator frequency control circuit to cause the frequency to change in a direction to minimize the IF frequency error. A second type of AFC, termed the bang-bang method, applies a fixed corrective voltage in one direction to repeatedly correct the oscillator frequency. If the IF frequency passes through the discriminator center or cross-over frequency and the video output exceeds a voltage threshold, the bang-bang AFC generates a type of flyback signal, whose magnitude is independent of the specific discriminator output, to rapidly return the oscillator frequency to a corresponding level on the other side of the center frequency so that the time-averaged discriminator output voltage is zero.

In certain situations it is desirable to provide a radar receiver which is not continuously tuned to a nominally constant transmitter frequency, but rather sweeps a prescribed bandwidth to search for received radar pulses whose exact frequency is not predictable. This type of receiver is normally designed to produce an output signal which duplicates the detected radar pulses. Once the receiver has locked on to radar pulses of a given carrier frequency, it must follow or track any subsequent change in the received frequency. In an environment of random noise spikes and pulsed radars with anomalous pulse repetition frequencies (P.R.F.) and varying frequency signals, search-lock receiver systems employing either the pure proportional or the pure bang-bang system have been found to be inadequately responsive. In the bang-bang system, if the local oscillator executes a linear frequency sweep during search mode, a rapid correction indicating the IF center frequency has been passed is followed by resumption of the frequency sweep at the same slope as in the search mode. Low P.R.F. signals may occur infrequently enough to allow the system to sweep out of the discriminator passband during the interpulse period. Too slow a search rate, on the other hand, will result in several pulses occurring within the passband before control can be accomplished, rendering the system incapable of following RF signals drifting in the same direction as the search ramp. Moreover, upon loss of the correction signal the local oscillator would go into the search mode, no frequency memory mechanism being present in the bang-bang system.

The proportional system also has drawbacks in the search-lock receiver since its accuracy depends on the amount of input information. Proportional AFC may require several pulses to accurately lock on to a received signal. With proportional AFC the oscillator will go from the search mode to the lock mode whenever a discriminator output occurs. The system must be externally reset to the search mode. While the proportional system has inherent frequency memory, the correction rate is not adjustable in accordance with the P.R.F. or frequency stability of received pulses. Moreover, a noise spike may cause the proportional system to incorrectly lock requiring reset whereas the bang-bang system cannot be halted by an isolated spurious spike.

SUMMARY OF THE INVENTION

Accordingly one of the objects of the invention is to permit an independently controlled rate of correction of the local oscillator frequency in two directions. Another object of the invention is to render the search-lock system invulnerable to random noise spikes. A further object of the invention is to improve the tracking capability of search-lock system by providing frequency memory in a nonproportional AFC system.

These and other objects of the invention are achieved by mixing an incoming RF signal with the output of the voltage controlled local oscillator to provide an IF signal which is stored in a circulating memory. A portion of the IF signal is amplified and passed to a frequency discriminator which produces a bipolar video output if the IF is within a predetermined bandwidth. Control voltage for the oscillator is provided by an integrator which receives selected constant voltage inputs. During the search mode a rising-voltage search ramp is generated by the integrator. A flyback circuit causes the search voltage to repeat its traverse over a prescribed range. Bipolar video outputs above a predetermined threshold place the system in the lock mode and selectively gate two corresponding constant voltage sources to furnish a triangle wave integrator output. The oscillator output is mixed with the stored IF to produce an RF output corresponding to the input signal.

DESCRIPTION OF THE PREFERRED EMBODIMENT

Figure 1:
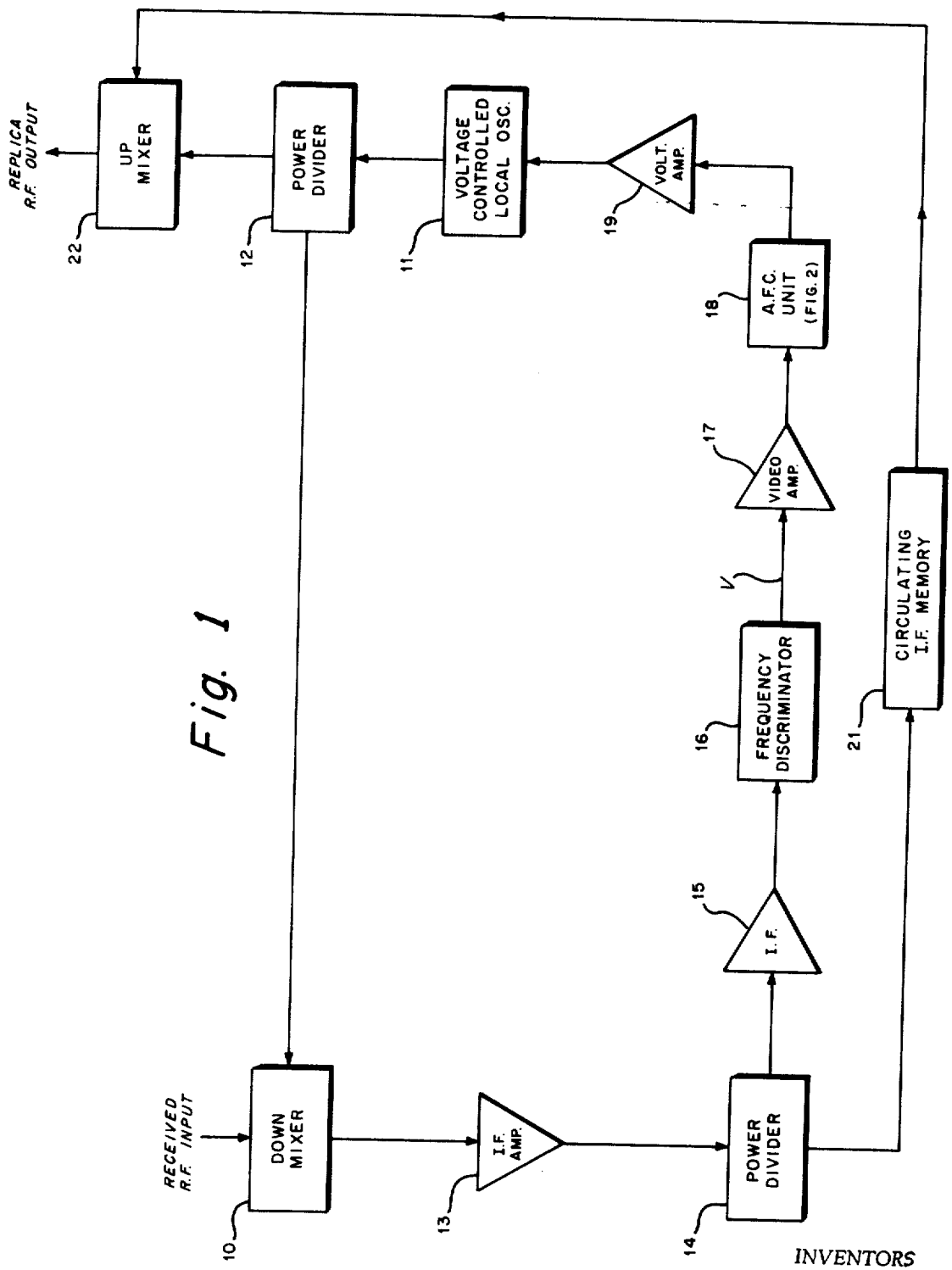
FIG. 1 is a block diagram of the search-lock system according to the invention.

Referring now to FIG. 1, a search-lock system is depicted in which received signals normally containing random noise as well as RF radar pulses, are fed to a down mixer 10. A voltage controlled local oscillator 11 supplies a varying RF output to a power divider 12 which may comprise a resistive network or waveguide device depending on the frequency ranges employed. A portion of the RF from local oscillator 11 is passed by divider 12 to down mixer 10 where it is combined with the received RF input to produce an IF signal representing the difference between the frequencies of the two inputs to mixer 10. If the received RF input comprises pulsed RF signals having a carrier frequency $f_0$ and the local oscillator signal is a continuous-wave (CW) RF signal of frequency $f_1$, the IF output of mixer 10 will be pulses having the same P.R.F. and pulse width as the received RF with a carrier frequency of $f_o - f_1$. The IF signal is passed via an IF amplifier 13 to a power divider 14 which may comprise a suitable resistive network applying a portion of the amplified IF signal to another IF amplifier 15 whose output is passed to frequency discriminator 16 which may comprise a conventional double-tuned detector of the type commonly used in radar receivers for distinguishing between those IF signals which are above and below a center or crossover frequency. The discriminator has a passband width centered on the crossover frequency and equal to the sum of the bandwidths of the two tuned circuits. The crossover point is established as that frequency for which equal positive and negative voltage outputs from each tuned circuit occur. Discriminator 16 is further equipped with two equally spaced positive and negative output threshold levels between which no output from discriminator 16 will be present. The output of discriminator 16 is conventionally referred to as a bipolar video output. There are two frequency zones for which discriminator 16 will produce an output. For example, a positive voltage output would indicate that the frequency was slightly above the center frequency but not out of the bandwidth. In any case, no video output will occur if the IF frequency is equal to the center frequency. The output of discriminator 16 is passed via video amplifier 17 to an automatic frequency control unit 18 whose output through a voltage amplifier 19 controls the frequency of local oscillator 11.

A portion of the amplified IF signal is routed by power divider 14 to a circulating memory 21 which may comprise an IF amplifier producing the memory output and having a feedback loop from the output to the amplifier input through a resistance, a switch means and a delay media, connected in series with each other. The delay media may comprise a conventional delay line or an acoustic delay device typically introducing a delay in the range of 0.1 to 0.5 microseconds. The switch may be a semiconductor diode switch at microwave frequencies or an amplifier operated at cut-off. More sophisticated embodiments of circulating memories, sometimes called ring-around memory systems, usually include limiter devices to prevent overdrive, filters to limit bandwidth and equalizers to flatten gain characteristics over the entire bandwidth encountered. If a single IF pulse enters circulating memory 21, it is amplified and returned to the input through the delay media by closing the switch. The delayed pulse re-enters the amplifier, is reamplified and passed around again through the delay media to the input. The continuing process ideally produces a continuous pulsed output, each pulse being a replica of the original single RF pulse. The output of memory 21 is passed to up mixer 22 which combines the memorized or stored IF with a portion of the RF output from local oscillator 11 supplied by divider 12 to provide a sum frequency modulated by the memorized pulse envelope, thus duplicating the received RF input carrier frequency.

Figure 2:
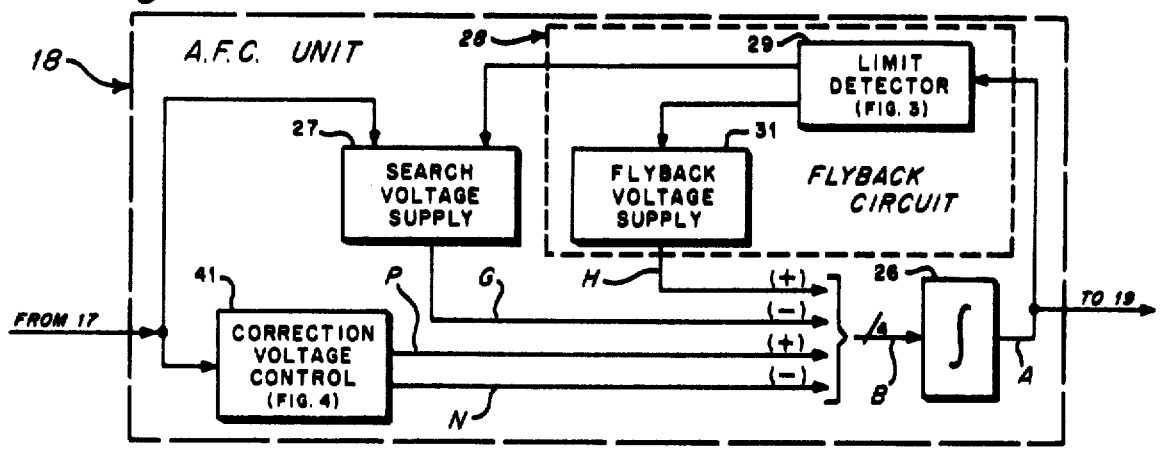
FIG. 2 is a block diagram of an AFC unit of FIG. 1.

Referring now to FIG. 2, the basic components of the AFC unit include an integrator 26 having four constant voltage inputs only one of which in energized at any given time. Integrator 26 provides a linearly increasing or decreasing output voltage as a function of the constant input voltage expressed by the following equation:

$$V_{out} = -\frac{1}{k}\int_{t_1}^{t_2} V_{in} dt$$

where $k$ represents a circuit constant; $V_{in}$ is the input voltage, in this case a constant; and $V_{out}$ is the output voltage. In order to maintain an approximate mathematical integration, it is necessary for the RC time constant of the integrator to be considerably longer than the period for one sweep during the search mode. If $V_{in}$ changes polarity, the slope of the output voltage will also undergo a change of polarity, for example, from rising to falling. The slope attitude of the output will be opposite to the polarity of the input voltage due to the minus sign in the above equation. The output of integrator 26 is applied to the tuning circuit of local oscillator 11 (FIG. 1) to effect a change in oscillator frequency which is typically proportional to the output voltage of integrator 26.

A search voltage supply 27 provides a negative constant voltage input to integrator 26 which generates therefrom a rising-voltage search ramp. A flyback circuit 28 receives the output of integrator 26, detects an upper voltage threshold in the integrator search ramp and rapidly forces the integrator output voltage to a lower threshold so that another search ramp can be generated. Accordingly, local oscillator 11 repeatedly transverses a prescribed bandwidth of frequencies corresponding to the integrator output voltage range.

A limit detector 29 in flyback circuit 28 momentarily interrupts voltage supply 27 and triggers a flyback positive voltage supply 31. In order to quickly decrease the level of the output voltage of integrator 26, the voltage provided by flyback supply 31 is a large positive voltage, typically 100 times the numerical value of the negative search voltage.

Figure 3:
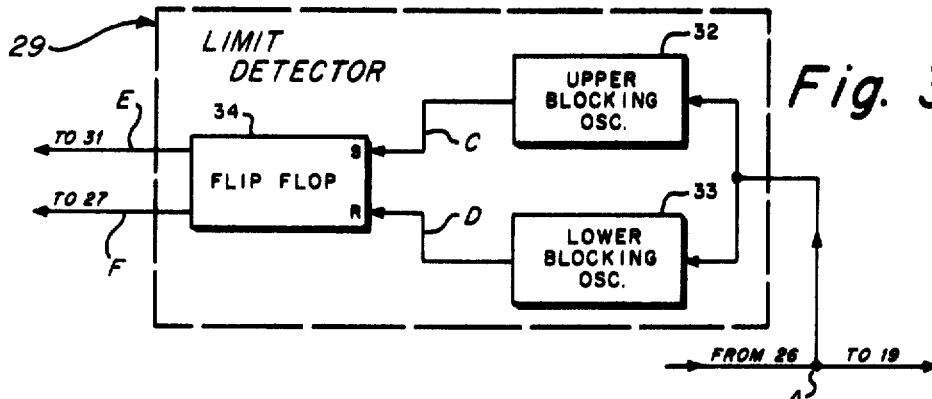
FIG. 3 is a block diagram of a limit detector of FIG. 2.

Referring to FIG. 3, a pair of blocking oscillators 32 and 33 in limit detector 29 fire respectively when an upper or lower voltage threshold is exceeded by the output of integrator 26. A flip-flop 34 having set and reset inputs and two corresponding outputs provides gating signals for search supply 27 and flyback supply 31. When upper blocking oscillator 32 fires, flip-flop 34 is set and flyback supply 31 is activated supplying a large positive voltage to integrator 26. At the same time the signal on the lead to search supply 27 inhibits the search voltage output to integrator 26. The integrator output voltage quickly falls to the level where lower blocking oscillator 33 is triggered resetting flip-flop 34. The inhibit signal is removed from supply 27 and flyback supply 31 is inhibited until the search ramp is regenerated to the upper threshold. A positive video pulse passing from discriminator 16 via amplifier 17 cuts off search voltage supply 27 and activates a correction voltage control 41.

Figure 4:
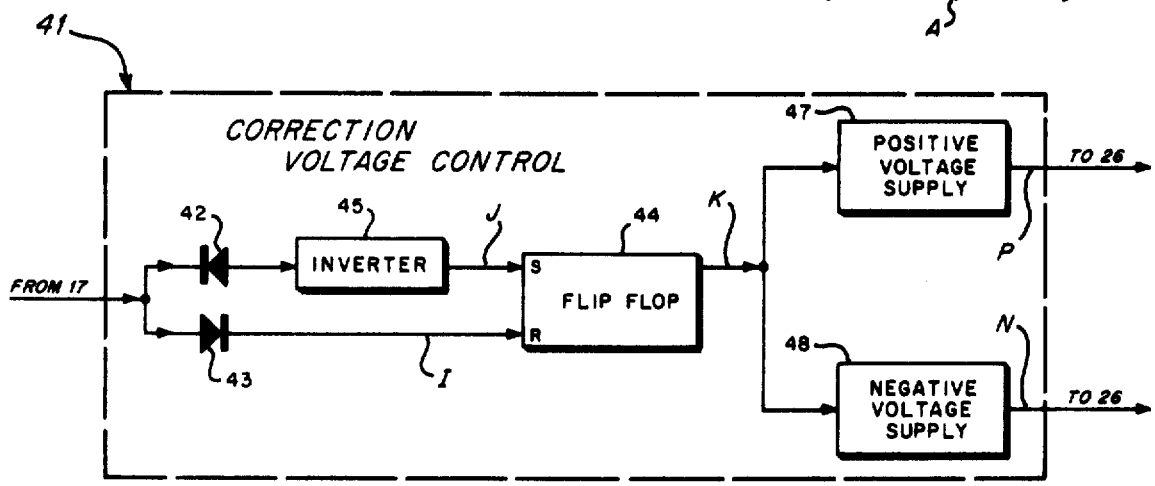
FIG. 4 is a block diagram of a correction voltage control of FIG. 2.

Referring now to FIG. 4, amplified positive and negative video voltage is passed respectively via diodes 42 and 43 to the set and reset input terminals of a conventional flip-flop 44 in correction voltage control 41. The polarity at the input terminals of flip-flop 44 is the same due to the inclusion of an inverter 45 between diode 42 and the set input of flip-flop 44. In the lock mode during normal excursion of the IF frequency about the discriminator center frequency, the output of flip-flop 44 will be switched successively from a high level to a low level. Settable positive and negative voltage supplies 47 and 48 are gated on respectively by the high and low levels of the output of flip-flop 44. The local oscillator frequency correction rate in either direction is determined by adjusting the levels of supplies 47 and 48.

Figure 5:
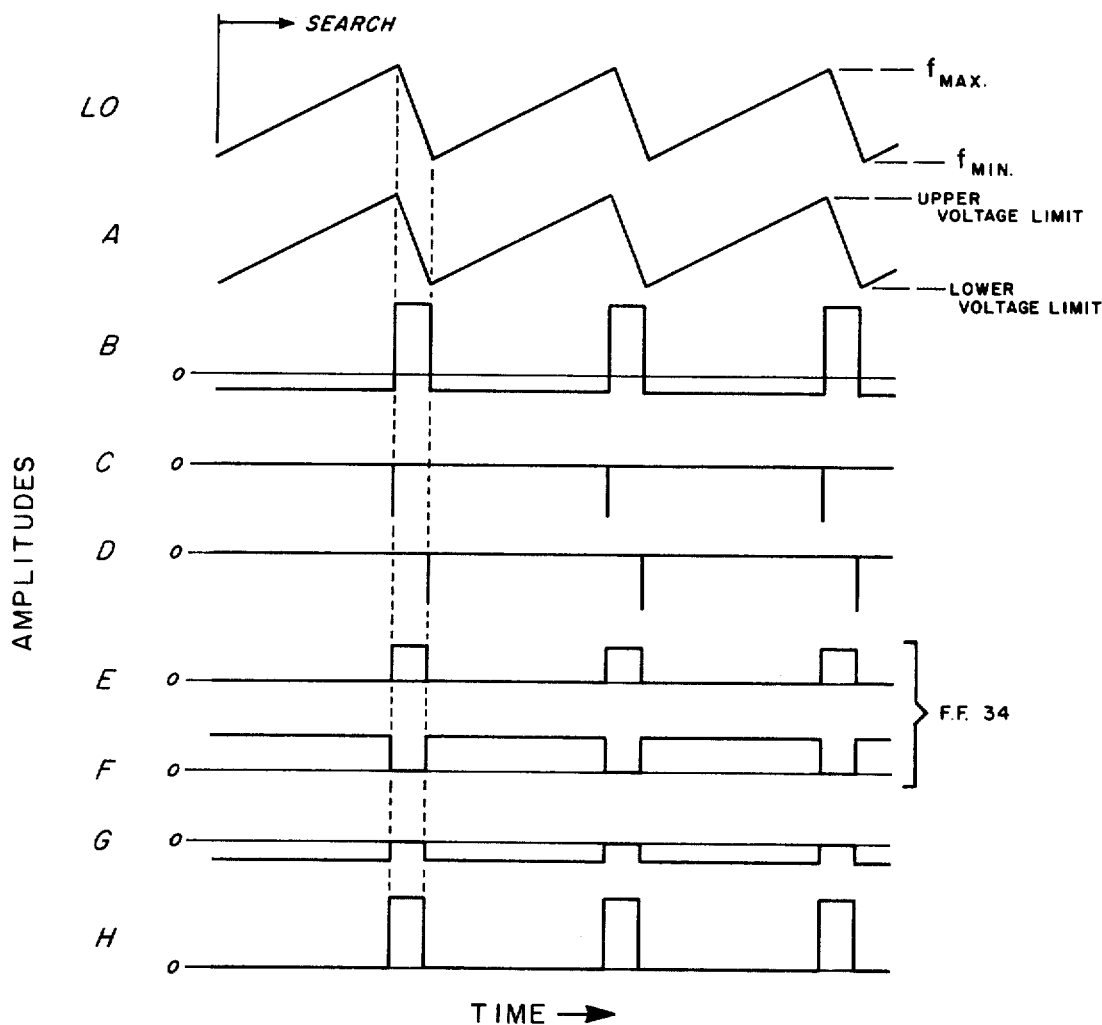
FIG. 5 is a timing diagram illustrating typical signals in the search mode.

In operation the local oscillator frequency varies between a prescribed minimum and maximum frequency as shown in FIG. 5 where the search mode of operation is depicted. The rising portion of the frequency curve associated with local oscillator 11 (LO) represents the search ramp while the steeper falling portion represents the effect of the flyback voltage. The oscillator frequency is approximately proportional to the output voltage level A of integrator 26. Line B of FIG. 5 represents the changing input voltage to integrator 26. The integrator output A rises under the influence of the negative search voltage of line G. When the upper limit is detected by limit detector 29, blocking oscillator 32 provides a pulse output in line C which sets flip-flop 34 causing output E to rise which in turn activates the positive flyback voltage supply output H. Flip-flop output F simultaneously drops to the lower level inhibiting the negative search voltage supply output G which returns to zero. Integrator output A quickly falls as backward integration of the large positive voltage occurs until the lower limit is detected causing blocking oscillator 33 to provide a pulse output D which resets flip-flop 34. Flip-flop outputs E and F are thus switched back to their normal state wherein the search voltage supply is enabled and the flyback voltage supply is inhibited. Successive voltage ramps are generated to provide a swept frequency band. Prior to lock the mode the IF frequency lies outside of the discriminator bandwidth and no effective video output is present.

Figure 6:
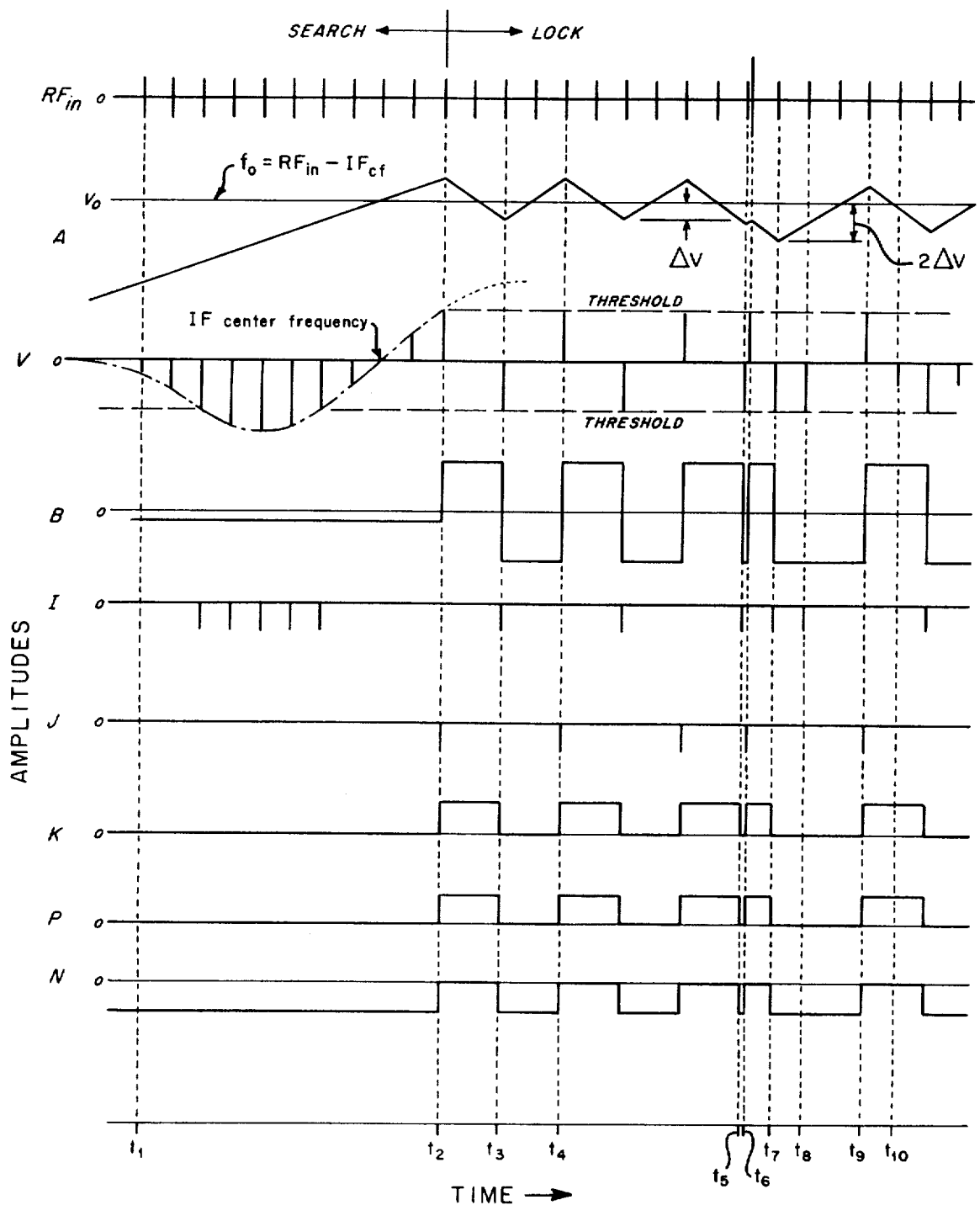
FIG. 6 is a timing diagram of typical signals in both search and lock modes.

In FIG. 6 the operation is illustrated as the system goes from search to lock mode upon detection of the desired IF. At $t_1$ down mixer 10 receives a pulsed radar signal having a constant P.R.F. and a carrier frequency $RF_{in}$. The frequency of local oscillator 11 is assumed to be traversing the selected bandwidth as represented by the integrator output A. When the IF or difference frequency enters the discriminator bandwidth, negative pulses occur. The first negative pulse having a magnitude above the lower threshold does not, however, place the system in the lock mode. Instead the search ramp of output A continues, and the IF passes through the discriminator center frequency until, at time $t_2$, a positive video pulse, above threshold, signals the end of the search mode and the beginning of the lock mode. The positive video pulse at $t_2$ inhibits the search voltage supply and allows the correction voltages to be applied to integrator 26. Lines I and J in FIG. 6 represent respectively the set and reset inputs to flip-flop 44 (FIG. 4). Since flip-flop 44 has been reset at the beginning of the search mode the pulses in line I have no effect, However, the pulse in line J at $t_2$, representing a positive, above-threshold video, causes flip-flop output K to go high. Negative voltage supply 48 is gated open only during the low condition of flip-flop 44 output K. Therefore, supply 48 is switched off as shown in line N at $t_2$. On the other hand, positive voltage supply 47 is gated open in response to high condition of output K, output P providing positive voltage to integrator 26. The composite change in integrator input voltage is shown in line B. The positive correction voltage, like the negative correction voltage, is typically five times the magnitude of the search voltage. Thus in lock mode the rate of fall in the integrator output A is somewhat steeper than the rising search ramp. As the integrator output A falls below $V_0$, corresponding to the desired local oscillator frequency $f_0$, the discriminator output V changes accordingly. In FIG. 6 the slope of the correction voltages has been adjusted in accordance with the pulse repetition frequency so that correction takes place on a pulse which falls exactly at the threshold voltage of the video output. Assuming two pulses occur before the IF frequency produces the proper video output, the first pulse will occur at a time when the IF or difference frequency is equal to the discriminator center frequency. At $t_3$ the local oscillator frequency has decreased far enough below its desired frequency $f_0$ so that pulsed IF produces a negative, above-threshold video pulse. This pulse in line I resets flip-flop 44 and output K falls to the low condition in which positive voltage supply 47 is gated off and supply 48 is activated providing negative voltage to integrator 26 as shown in line B. Integration of the negative voltage produces a linear frequency correcting output ramp in line A. Time $t_4$, like $t_2$ marks the appearance of a positive video pulse which sets flip-flop 44 causing output K to rise again and negative voltage to be supplied to integrator 26. The local oscillator frequency follows a triangle waveform centered approximately on the desired frequency $f_0$ which, when mixed with the memorized IF frequency, produces the desired RF replica output. The excursions of the local oscillator frequency about $f_0$ may represent negligible frequency error if the upper and lower thresholds of the discriminator video output are appropriately reduced.

The system's ability to cope with noise spikes while in the lock mode is illustrated at $t_5$ (FIG. 6). The spike appearing with the $RF_{in}$ signal is assumed to include frequencies which, when combined with the local oscillator frequency, produce a positive video output from the discriminator. The worst possible time for a spike to occur would be just after and in the opposite direction of a correction pulse. For example, it is assumed that at $t_5$ a negative video pulse occurred causing negative voltage to be supplied to integrator 26 which began to generate a rising correction ramp in line A. The occurrence of a noise spike in the wrong direction toggles flip-flop output K causing the falling output voltage of integrator 26 in line A to be resumed. At $t_7$, however, a negative video pulse corrects the voltage ramp causing the negative voltage supply to be again switched on to increase the level of output A. In the absence of noise spikes, output A underwent excursion of $\pm\Delta V$ on either side of the desired voltage $V_0$. Because of the noise spike at $t_6$ an additional $-\Delta V$ deviation occurred producing a total deviation of $-2\Delta V$. Thus if a noise spike of the correct frequency occurs at just the wrong time, the worst effect on the system will be to double momentarily the deviation of output A. It is conceivable that such noise spikes could occur in succession and decrease the local oscillator frequency to such an extent that the IF frequency would be driven out of the discriminator bandwidth destroying the RF lock. Nevertheless, since noise is usually random in frequency and time, a low probability exists for the successive occurrence of the necessary spikes. It should be noted that if the noise spike at $t_6$ had been of correct frequency to produce a negative video output, there would have been no effect on output A. Those skilled in the art will recognize that there are numerous other instances where isolated noise spikes will have practically no effect on the lock mode.

Referring again to FIG. 6, the next occurrence of a negative video pulse at $t_8$ has no effect on the rising voltage of output A since flip-flop 44, output K, has already been set at $t_7$. Output A continues to rise until $t_9$ where an $RF_{in}$ pulse coincides with a local oscillator frequency sufficient to produce a positive video output. If, at $t_9$ when the $RF_{in}$ pulse occurred, output A had not risen far enough, the video output might fail to reach threshold causing output A to continue to rise until the next $RF_{in}$ pulse was met at $t_{10}$. In this event the deviation of output A above $V_0$ would also be approximately $2\Delta V$. In FIG. 6, however, it is assumed that a positive, above-threshold video pulse occurs at $t_9$ reversing the direction of correction. The local oscillator frequency will remain locked on the desired frequency until reset or until the $RF_{in}$ radar pulses disappear. If the $RF_{in}$ carrier frequency changes, the desired $V_0$ level in integrator output A would change to a corresponding new level. The system would remain in the lock condition and track the changing RF input signal.

The RF output of the system of FIG. 1 is essentially the sum of the IF or difference frequency and the RF of local oscillator 11. The output of oscillator 11 is CW; therefore, if the IF is also CW, the system output will be a CW RF signal. If the IF input to mixer 22 is from circulating memory 21 (FIG. 1), the system output is an RF pulse train. That is, the CW local oscillator output will be modulated by the pulse envelope from memory 21. The resultant RF output from up mixer 22 will be a series of pulses at the $RF_{in}$ carrier frequency, but with a pulse width equal to that of the pulses retained by memory 21.

The IF input to mixer 22 does not necessarily have to be from memory 21. The memory feature of the system of FIG. 1 is useful in cases where the $RF_{in}$ carrier frequency is varying and tracking is necessary or where the P.R.F. is irregular. It is possible, however, to mix the local oscillator frequency with an IF signal produced by a fixed frequency IF oscillator producing a CW output. The oscillator frequency would be adjusted in accordance with the system IF frequency output from down mixer 10 or permanently set at the discriminator center frequency. It also may be desirable in some cases to delete circulating memory 21 and provide direct input from divider 14 to mixer 22. Such connection would be permissible in cases where the $RF_{in}$ carrier frequency remained relatively constant.

Those skilled in the art will recognize that the discriminator bandwidth, threshold values and correction rates associated with voltage supplies 47 and 48 can be optimized with respect to the expected P.R.F. or data rate and frequency stability of the $RF_{in}$ signal. The optimum correction rate is one that provides a frequency change at the voltage controlled oscillator that is fast enough to follow frequency changes of the input signal, but slow enough to prevent the local oscillator from forcing the IF frequency out of the discriminator bandwidth before receiving a subsequent $RF_{in}$ pulse.

Numerous advantages are achieved by the present system. A controlled rate of frequency correction in two directions is permitted. The correction rate has been made independent of the magnitude of the frequency error. A single pulse is sufficient to place the system in the lock mode. However, subsequent noise spikes have little effect on the oscillator frequency. In the typical situation the worst effect of a noise spike would be to double the frequency error momentarily. By allowing a controlled correction rate in both directions, the tracking capability of the present system can be optimized for a given data rate. Moreover it is possible to search at one rate, correct downwardly at another rate and correct upwardly at still another rate, thus providing added flexibility over prior art search lock devices. Since the frequency correction is non-proportional to the magnitude of the error, and interpulse disturbance can only change the direction, but not the magnitude, of the AFC correction. Thus, the system is relatively invulnerable to break-locks due to interpulse noise. The system will remain locked in a moderately noisy environment if enough $RF_{in}$ pulses are available to keep the input signal in the discriminator bandwidth.

When the system is used in conjunction with the IF circulating or ring-around memory, the RF output signal varies in frequency from the preceding $RF_{in}$ pulse only by the magnitude of the AFC oscillator frequency change which is controlled by the AFC correction rate. Thus a high frequency RF output, which differs from the RF input in only hundreds of cycles depending on the correction rate setting, may be obtained a few microseconds after the input pulse was received. A controlled correction rate AFC system according to the invention will operate satisfactorily with a memory system and is capable of accurate frequency reproduction even with received signal-to-noise ratios as low as 3 db. A proportional AFC system would correct on each noise spike, ordinarily breaking AFC lock with this high a noise ratio. The prior art bang-bang AFC system achieves a high degree of design simplicity by using the same rate of correction for search and lock modes at the sacrifice of noise immunity. On the other hand, the present invention, by employing a common integrator having switchable constant inputs achieves both design simplicity and noise immunity.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A search-lock system for detecting and monitoring a discrete RF input signal against a background of random noise, comprising:
   a voltage controlled oscillator;
   first mixer means having inputs adapted to receive an RF signal and connected to receive a portion of the oscillator output for providing an IF difference signal;
   discriminator means having an input operatively connected to said first mixer means and receiving the IF signal for providing first or second output signals when the IF signal is respectively within a first bandwidth above a predetermined reference frequency or within a second bandwidth below the predetermined reference frequency;
   integrator means having an output connected to the oscillator input to provide a control signal thereto;
   a search generator having outputs selectively applying a first high signal or first low signal to the integrator input for producing a first step function at said integrator input, said search generator having an input connected to the discriminator means output inhibiting the search generator outputs in response to said discriminator means first output signal; and
   a correction generator connected between the discriminator means output and the integrator input applying a second high or a second low signal to the integrator input in response to said discriminator means first or second output signals respectively for producing a second step function at the integrator input;
   whereby the oscillator output is maintained at a predetermined frequency level relative to the RF signal.

2. A search-lock system according to claim 1 further comprising:
   second mixer means having inputs operatively connected to receive the IF difference signal and the oscillator output for combining the inputs thereof to produce a sum signal corresponding to the RF signal.

3. A search-lock system according to claim 2 further comprising:
   means connected between the first mixer means output and the second mixer means IF input for storing the IF difference signal and producing a delayed replica output thereof to said second mixer means.

4. A search-lock system according to claim 3 wherein:
   said storing means comprises an IF circulating memory.

5. A search-lock system for detecting and duplicating a discrete RF input signal against a background of random noise, comprising:
   a voltage controlled oscillator;
   first mixer means having inputs adapted to receive an RF signal and connected to receive a portion of the oscillator output for providing an IF difference signal;
   discriminator means having an input coupled to the first mixer means output and operatively receiving the IF signal for producing a video output indicating that the IF signal frequency is within prescribed limits above or below a predetermined frequency;
   automatic frequency control means connected between the oscillator input and the discriminator means output for applying a search signal to said oscillator to cause the oscillator output frequency to traverse a prescribed bandwidth, and responsive to said discriminator means output for inhibiting the search signal to apply predetermined correction signals to said oscillator;
   memory means having an input connected to receive the IF signal and producing a delayed replica thereof; and
   second mixer means having inputs operatively connected to the memory means output and the oscillator output for combining the inputs thereof to produce a sum signal corresponding to the RF signal.

6. A search-lock system according to claim 5 wherein:
   said discriminator means video output includes a first or a second signal when the IF signal frequency is respectively within a first bandwidth above the reference frequency or within a second bandwidth below the reference frequency, the first and second bandwidths being separated by a predetermined frequency gap centered on the reference frequency; and
   said automatic frequency control means comprises integrator means having an output connected to the oscillator input, first and second voltage supply means for applying respectively a first high and a first low signal to the integrator input, limit detector means connected to the integrator output for activating the first or second supply means respectively in response to a first or second predetermined level of the integrator output, third and fourth voltage supply means for applying respectively second high and second low signals to the integrator input, means for inhibiting the first high and low signals in response to said discriminator means first signal, and switch means for activating the third or the fourth supply means in response to said discriminator first or second signal.

7. A search-lock system according to claim 6 wherein:
   said memory means comprises an IF circulating memory.

8. A search-lock system for detecting and duplicating a discrete RF input signal against a background of random noise, comprising:
   search signal generating means;

control means connected to said generating means for causing the frequency of the search signal to traverse a prescribed bandwidth;

first means connected to said generating means for combining an input signal with the search signal to produce a difference signal;

means connected to said first combining means for storing the difference signal;

means connected to said first combining means for comparing the difference signal frequency with a predetermined reference frequency;

means connected to said comparing means for generating first or second error signals indicating respectively that the difference signal frequency is within prescribed limits above or below the predetermined reference frequency;

means connected to said control means inhibiting the traverse of the search signal frequency in response to the first error signal;

means connected to said generating means for correcting the search signal frequency in one direction in response to the first error signal at a rate independent of the magnitude of either error signal;

means connected to said generating means for correcting the search signal frequency in the opposite direction in response to the second error signal at a rate independent of the magnitude of either error signal; and second means connected to said storing means and said generating means for combining the search signal with the stored difference signal to produce a sum signal which is a replica of the input signal.

* * * * *